United States Patent
Lu et al.

(10) Patent No.: US 12,406,491 B2
(45) Date of Patent: Sep. 2, 2025

(54) METHOD FOR DETERMINING COEFFICIENTS OF DEBLUR FILTER

(71) Applicant: REALTEK SEMICONDUCTOR CORPORATION, Hsinchu (TW)

(72) Inventors: Shian-Shin Lu, Hsinchu (TW); Tsung-Hsuan Li, Hsinchu (TW); Shih-Tse Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 327 days.

(21) Appl. No.: 17/955,771

(22) Filed: Sep. 29, 2022

(65) Prior Publication Data

US 2023/0111942 A1 Apr. 13, 2023

(30) Foreign Application Priority Data

Oct. 8, 2021 (TW) .................. 110137588

(51) Int. Cl.
*G06V 10/00* (2022.01)
*G06V 10/24* (2022.01)
*G06V 10/98* (2022.01)

(52) U.S. Cl.
CPC .............. *G06V 10/98* (2022.01); *G06V 10/24* (2022.01)

(58) Field of Classification Search
CPC ........ G06V 10/98; G06V 10/24; G06V 10/25; G06V 10/44; G06V 10/30
See application file for complete search history.

(56) References Cited

U.S. PATENT DOCUMENTS

| | | | |
|---|---|---|---|
| 10,762,610 B2* | 9/2020 | Li | G06T 3/4015 |
| 2013/0163882 A1* | 6/2013 | Smith | G06T 5/20 |
| | | | 382/199 |
| 2018/0137606 A1 | 5/2018 | Zhang | |
| 2019/0228506 A1* | 7/2019 | DeWeert | G06T 5/73 |
| 2024/0013350 A1* | 1/2024 | Delbracio | G06T 5/73 |

FOREIGN PATENT DOCUMENTS

| | | |
|---|---|---|
| CN | 105493140 A | 4/2016 |
| CN | 109377459 A | 2/2019 |
| TW | I677233 | 2/2020 |

OTHER PUBLICATIONS

Gaster, B. (2012). Heterogeneous computing with opencl. Morgan Kaufmann. (Year: 2012).*
Sun, S., Duan, L., Xu, Z., & Zhang, J. (2021). Blind Deblurring Based on Sigmoid Function. Sensors, 21(10), 3484. https://doi.org/10.3390/s21103484 (Year: 2021).*

(Continued)

*Primary Examiner* — Vu Le
*Assistant Examiner* — Zaid Muhammad Saleh
(74) *Attorney, Agent, or Firm* — WPAT, PC (57) ABSTRACT

A method for determining deblur filter coefficients includes the following steps: generating an edge profile according to the data of a blurred image; estimating a blur kernel according to the edge profile, wherein the blur kernel indicates how an imaging process blurs original image data and thereby generates blurred image data; and determining coefficients of a deblur filter to make a process result of the deblur filter processing the blurred image data approach the original image data.

8 Claims, 5 Drawing Sheets

(56) References Cited

OTHER PUBLICATIONS

OA letter of a counterpart TW application (appl. No. 110137588) mailed on Jul. 5, 2022.Summary of the TW OA letter in regard to the TW counterpart application:(1) Claims 1 and 7-9 are rejected as being unpatentable over the cited reference 1 (CN105493140A) in view of the cited reference 2 (CN109377459A).P.S. Correspondence between the claims of the TW counterpart application and the claims of the present US application:(1) Claims 1-10 of the TW counterpart application are corresponding to the claims 1-10 of the present US application respectively.
Convolution—Wikipedia, https://en.wikipedia.org/wiki/Convolution.
Heide et al. "High-Quality Computational Imaging Through Simple Lenses" 2013, http://www.cs.ubc.ca/labs/imager/tr/2013/SimpleLensImaging/.
Aksoy, "Image Edge Detection with Signal Processing Approach by Mehmet Çağri Aksoy Medium" Feb. 17, 2019, Mcagriaksoy.meduium.com.
"Imatest version 4.2", Sep. 16, 2015, imatest, https://www.imatest.com/2015/09/imatest-version-4-2/.
"Deconvolution" Fall 2018, Lecture12, http://graphcis.cs.cmu.edu/courses/15-463, Computational Photography.
"Sharpness: What is it and How it is Measured", imatest, https//www.imatest.com/docs/sharpness/.
"Contstrained least squares" (pp. 15-16), Spring 2021, http://www.seas.ucla.edu/~vandenbe/133A/lectures/cls.pdf.
Boyd "Derivative, Gradient, and Lagrange Multipliers" gradient-lagrange(pp. 3-4), http://ee263.standford.edu/notes/gradient/lagrange.pdf.
Edge detection—Wikipedia, https://en.wikipedia.org/wiki/Edge_detection.
Error function—Wikipedia, https://en.wikipedia.org/wiki/Error_function.
Gaussian blur—Wikipedia, https://en.wikipedia.org/wiki/Gaussian_blur.
"Gradient method" Spring, 2020, https://www.seas.ucla.edu/~vandenbe/236C/lectures/gradient.pdf.
Logistic function—Wikipedia, https://en.wikipedia.org/wiki/Logistic_function.
Sigmoid function—Wikipedia, https://en.wikipedia.org/wiki/Sigmoid_function.

\* cited by examiner

S510 — calculating according to collected data and/or assigned data and thereby making a difference between the process result and the original image data is less than a threshold so that the coefficients of the deblur filter can be determined

Fig. 5

METHOD FOR DETERMINING COEFFICIENTS OF DEBLUR FILTER

BACKGROUND OF THE INVENTION

1. Field of the Invention

The present disclosure relates to the design of a filter, especially to a method for determining the coefficients of a deblur filter.

2. Description of Related Art

Two methods are usually used for sharpening an image. One of the methods involves amplifying the high-frequency components of an image signal directly, but this method usually has oversharpening problems which leads to unnatural black-and-white boundaries in a sharpened image. The other method involves using deconvolution to reverse the process of an imaging system blurring an image and thereby sharpen the image, but this method needs to obtain a blur kernel representing the blur characteristics of the imaging system in advance through expensive measuring equipment.

SUMMARY OF THE INVENTION

An object of the present disclosure is to provide a method for determining the coefficients of a deblur filter without the problems of the prior arts.

An embodiment of the method of the present disclosure includes the following steps: generating an edge profile according to data of an image; estimating a blur kernel according to the edge profile, wherein the blur kernel indicates how an imaging process blurs original image data and thereby generates blurred image data; and determining coefficients of a deblur filter to make a process result of the deblur filter processing the blurred image data approach the original image data.

On the basis of the above, an embodiment of the step of generating the edge profile includes: ascertaining an edge position of each of multiple rows in a region of interest (ROI) of the image, wherein each of the multiple rows includes multiple edge-neighboring pixels, and the distance between each of the multiple edge-neighboring pixels of a certain row of the multiple rows and the edge position of the certain row is shorter than a predetermined distance; aligning the edge positions of the multiple rows; and after aligning the edge positions of the multiple rows, averaging all of the edge-neighboring pixels of the multiple rows at the same horizontal position and thereby obtaining a row of average values as the edge profile.

Another embodiment of the step of generating the edge profile includes: generating the edge profile based on a Gaussian smoothed step edge algorithm.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a method for determining coefficients of a deblur filter. The method is based on deconvolution. Although a conventional deconvolution-based sharpening method needs to obtain a blur kernel representing the blur characteristics of an imaging system in advance through expensive measuring equipment, the method of the present disclosure can obtain the blur kernel without expensive measuring equipment; more specifically, the method of the present disclosure estimates the blur kernel according to an edge profile of an image (e.g., a blurred image) and then determines the coefficients of the deblur filter with the method described in the applicant's US patent of "U.S. Pat. No. 10,762,610 B2" (hereinafter referred to as '610 patent).

Figure 1:
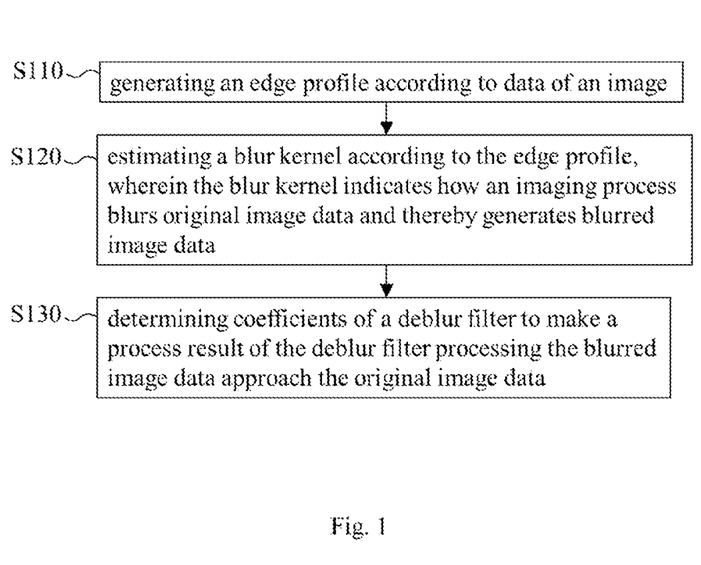
FIG. 1 shows an embodiment of the method of the present disclosure.

FIG. 1 shows an embodiment of the method of the present disclosure, this embodiment including the following steps:

S110: generating an edge profile according to data of an image (e.g., a blurred image). For example, the edge profile can be generated by a known/self-developed slanted-edge method.

S120: estimating a blur kernel according to the edge profile, wherein the blur kernel indicates how an imaging process blurs original image data and thereby generates blurred image data. In the embodiment of FIG. 1, the sum of the coefficients of the blur kernel is one, but this is not a limitation on the implementation of the present invention if the implementation is practicable. In the embodiment of FIG. 1, the data of the image are blurred image data.

S130: determining coefficients of a deblur filter to make a process result of the deblur filter processing the blurred image data approach the original image data. In the embodiment of FIG. 1, the sum of the coefficients of the deblur filter is one, but this is not a limitation on the implementation of the present invention if the implementation is practicable.

Figure 2:
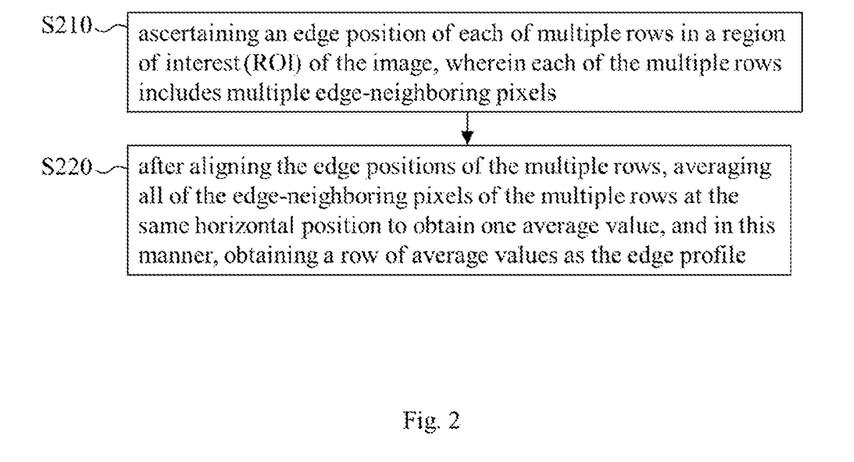
FIG. 2 shows an exemplary implementation of the step S110 of FIG. 1.

FIG. 2 shows an exemplary implementation of the step S110 of FIG. 1. This implementation includes:

S210: ascertaining an edge position of each of multiple rows in a region of interest (ROI) of the image (e.g., the non-ellipsis 7×5 region of the image:

$$\begin{bmatrix} \cdots & \vdots & \vdots & \vdots & \vdots & \vdots & \vdots & \cdots \\ \cdots & 0 & 3 & 4 & 4 & 4 & 4 & \cdots \\ \cdots & 0 & 2 & 3 & 3 & 3 & 3 & \cdots \\ \cdots & 0 & 0 & 5 & 6 & 6 & 6 & \cdots \\ \cdots & 0 & 0 & 0 & 2 & 3 & 3 & \cdots \\ \cdots & 0 & 0 & 0 & 4 & 5 & 5 & \cdots \\ \cdots & \vdots & \vdots & \vdots & \vdots & \vdots & \vdots & \cdots \end{bmatrix},$$

wherein each of the multiple rows includes multiple edge-neighboring pixels, and the distance between each of the multiple edge-neighboring pixels of a certain row of the multiple rows and the edge position of the certain row is shorter than a predetermined distance (e.g., a distance of three pixels). The predetermined distance is set according to the demand for implementation.

For example, the step S210 includes: determining the ROI including the multiple rows $$\left(\text{e.g., }\begin{bmatrix} \cdots & \vdots & \vdots & \vdots & \vdots & \vdots & \vdots & \cdots \\ \cdots & 0 & 3 & 4 & 4 & 4 & 4 & \cdots \\ \cdots & 0 & 2 & 3 & 3 & 3 & 3 & \cdots \\ \cdots & 0 & 0 & 5 & 6 & 6 & 6 & \cdots \\ \cdots & 0 & 0 & 0 & 2 & 3 & 3 & \cdots \\ \cdots & 0 & 0 & 0 & 4 & 5 & 5 & \cdots \\ \cdots & \vdots & \vdots & \vdots & \vdots & \vdots & \vdots & \cdots \end{bmatrix}\right),$$

wherein each of the multiple rows includes multiple pixels (e.g., several, tens, or hundreds of pixels); ascertaining a pixel position of a maximum absolute value of gradient in each of the multiple rows and then treating the pixel position as an edge position, and thereby obtaining the edge positions of the multiple rows (e.g., the positions of the first nonzero pixel values "3" (maximum gradient: |3-0|), "2" (maximum gradient: |2-0|), "5" (maximum gradient: |5-0|), "2" (maximum gradient: |2-0|), and "4" (maximum gradient: |4-0|) in the multiple rows of $$\begin{bmatrix} \cdots & \vdots & \vdots & \vdots & \vdots & \vdots & \vdots & \cdots \\ \cdots & 0 & 3 & 4 & 4 & 4 & 4 & \cdots \\ \cdots & 0 & 2 & 3 & 3 & 3 & 3 & \cdots \\ \cdots & 0 & 0 & 5 & 6 & 6 & 6 & \cdots \\ \cdots & 0 & 0 & 0 & 2 & 3 & 3 & \cdots \\ \cdots & 0 & 0 & 0 & 4 & 5 & 5 & \cdots \\ \cdots & \vdots & \vdots & \vdots & \vdots & \vdots & \vdots & \cdots \end{bmatrix};$$

and aligning the edge positions of the multiple rows and thereby making the edge positions of the multiple rows have the same horizontal position $$\left(\text{e.g., }\begin{bmatrix} \cdots & \vdots & \vdots & \vdots & \vdots & \vdots & \vdots & \cdots \\ \cdots & 0 & 3 & 4 & 4 & 4 & 4 & \cdots \\ \cdots & 0 & 2 & 3 & 3 & 3 & 3 & \cdots \\ \cdots & 0 & 5 & 6 & 6 & 6 & 6 & \cdots \\ \cdots & 0 & 2 & 3 & 3 & 3 & 3 & \cdots \\ \cdots & 0 & 4 & 5 & 5 & 5 & 5 & \cdots \\ \cdots & \vdots & \vdots & \vdots & \vdots & \vdots & \vdots & \cdots \end{bmatrix}\right).$$

It is noted that in the present specification, the term "horizontal position" is used for explanation, and those having ordinary skill in the art can appreciate that this term here is not interpreted as "horizontal position in a physical space". It is also noted that any known/self-developed method can be used for ascertaining the pixel position of the maximum absolute value of gradient.

S220: after aligning the edge positions of the multiple rows $$\left(\text{e.g., }\begin{bmatrix} 0 & 0 & 3 & 0 & 0 \\ 0 & 0 & 2 & 0 & 0 \\ 0 & 0 & 5 & 0 & 0 \\ 0 & 0 & 2 & 0 & 0 \\ 0 & 0 & 4 & 0 & 0 \end{bmatrix}\right),$$

averaging all of the edge-neighboring pixels of the multiple rows at the same horizontal position to obtain one average value, and in this manner, obtaining a row of average values $$\left(\text{e.g., }\left[\frac{0+0+0+0+0}{5} \quad \frac{0+0+0+0+0}{5} \quad \frac{3+2+5+2+4}{5} \quad \frac{0+0+0+0+0}{5} \quad \frac{0+0+0+0+0}{5}\right]\right)$$

as the edge profile.

It is noted that the edge profile can be generated in another way. For example, a Gaussian smoothed step edge algorithm can be used for generating the edge profile as mentioned in the public website: https://en.wikipedia.org/wiki/Edge_detection#A_simple_edge_model.

Figure 3:
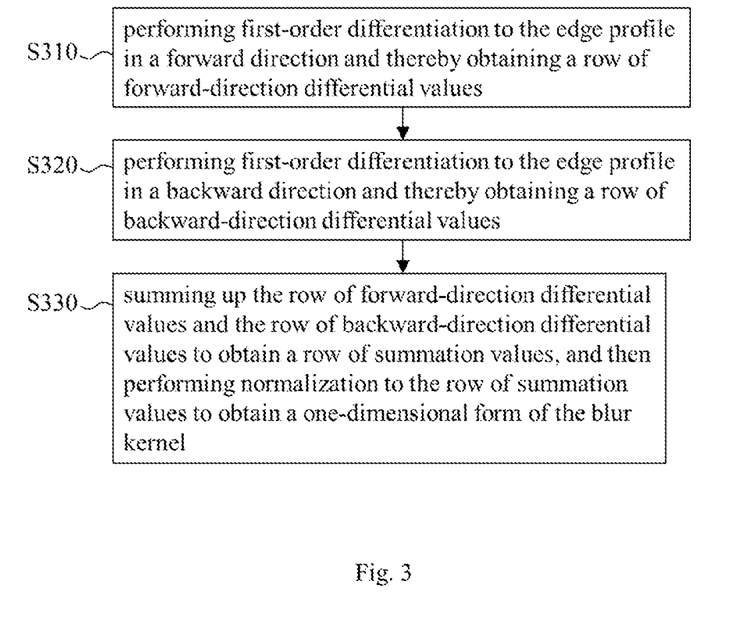
FIG. 3 shows an exemplary implementation of the step S120 of FIG. 1.

FIG. 3 shows an exemplary implementation of the step S120 of FIG. 1. This implementation includes:

S310: performing first-order differentiation to the edge profile in a forward direction and thereby obtaining a row of forward-direction differential values.

For example, the edge profile is [$x_1$ $x_2$ $x_3$ $x_4$ $x_5$ $x_6$], and the row of forward-direction differential values is [($x_2$−$x_1$) ($x_3$−$x_2$) ($x_4$−$x_3$) ($x_5$−$x_4$) ($x_6$−$x_5$)]=[$y_1$ $y_2$ $y_3$ $y_4$ $y_5$]. It is noted that the size of the edge profile can be expanded or reduced according to the demand for implementation.

S320: performing first-order differentiation to the edge profile in a backward direction and thereby obtaining a row of backward-direction differential values. For example, the edge profile is [$x_1$ $x_2$ $x_3$ $x_4$ $x_5$ $x_6$], and the row of backward-direction differential values is [($x_6$−$x_5$) ($x_5$−$x_4$) ($x_4$−$x_3$) ($x_3$−$x_2$) ($x_2$−$x_1$)]=[$z_1$ $z_2$ $z_3$ $z_4$ $z_5$].

S330: summing up the row of forward-direction differential values and the row of backward-direction differential values to obtain a row of summation values, and then performing normalization to the row of summation values to obtain a one-dimensional form of the blur kernel.

For example, the row of forward-direction differential values is the aforementioned [$y_1$ $y_2$ $y_3$ $y_4$ $y_5$], the row of backward-direction differential values is the aforementioned [$z_1$ $z_2$ $z_3$ $z_4$ $z_5$], the row of summation values after normalization (i.e., the one-dimensional form of the blur kernel) is $$\left[\frac{y_1+z_1}{t} \quad \frac{y_2+z_2}{t} \quad \frac{y_3+z_3}{t} \quad \frac{y_4+z_4}{t} \quad \frac{y_5+z_5}{t}\right] =$$
$$[s_1 \quad s_2 \quad s_3 \quad s_4 \quad s_5] = s^T,$$

wherein $$t = \Sigma_{i=1}^{5}(y_i + z_i) = 2(x_6 - x_1).$$

Figure 4:
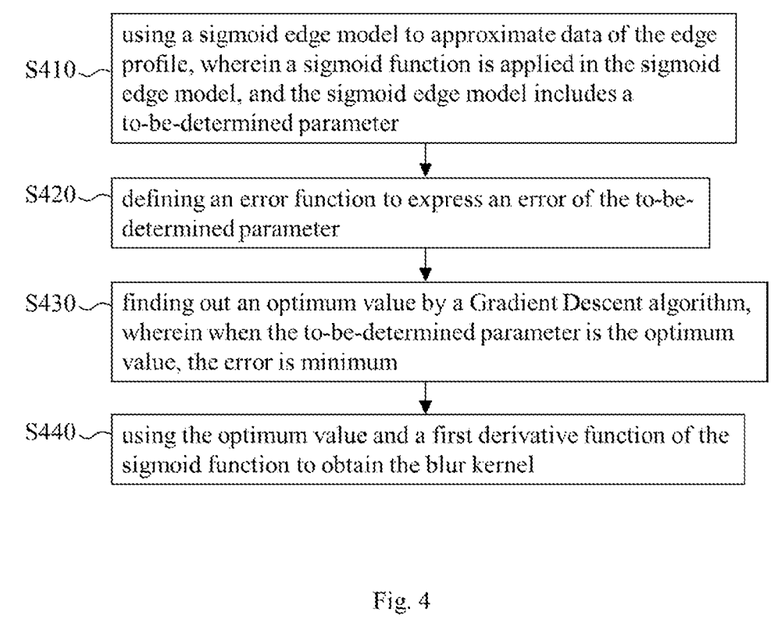
FIG. 4 shows another exemplary implementation of the step S120 of FIG. 1.

FIG. 4 shows another exemplary implementation of the step S120 of FIG. 1. This implementation includes:

S410: using a sigmoid edge model to approximate data of the edge profile, wherein a sigmoid function is applied in the sigmoid edge model, and the sigmoid edge model includes a to-be-determined parameter.

For example, an embodiment of the sigmoid edge model can be expressed as $$x_k \approx \frac{x_1 + x_6}{2} + (x_6 - x_1) \cdot \left( S\left( \frac{k - \frac{1+6}{2}}{c} \right) - \frac{1}{2} \right),$$

wherein the parameter "c" is the to-be-determined parameter, and the definition of the sigmoid function $S(w)$ is $$S(w) = \frac{e^w}{e^w + 1}$$

which is found in the public website: https://en.wikipedia.org/wiki/Sigmoid_function.

S420: defining an error function to express an error of the to-be-determined parameter.

For example, an embodiment of the error function can be expressed as $$E(c) = \sum_{k=1}^{6} \left( \left( \frac{x_1 + x_6}{2} + (x_6 - x_1) \cdot \left( S\left( \frac{k - \frac{1+6}{2}}{c} \right) - \frac{1}{2} \right) \right) - x_k \right)^2.$$

S430: finding out an optimum value by a Gradient Descent algorithm, wherein when the to-be-determined parameter is the optimum value, the error is minimum. The Gradient Descent algorithm is found in the following public website: https://www.seas.ucla.edu/~vandenbe/236C/lectures/gradient.pdf.

For example, the optimum value ($C_{opt}$) can be expressed as follows:

$$c_{opt} = \underset{c>0}{\mathrm{argmin}} E(c).$$

S440: using the optimum value and a first derivative function of the sigmoid function (i.e., $S(w) \cdot (1-S(w))$) to obtain the blur kernel.

For example, the blur kernel can be expressed as follows:

$$\left[ \frac{y_1}{t} \quad \frac{y_2}{t} \quad \frac{y_3}{t} \quad \frac{y_4}{t} \quad \frac{y_5}{t} \right] = [s_1 \quad s_2 \quad s_3 \quad s_4 \quad s_5] = s^T$$

$$y_k = S\left( \frac{k - \frac{1+5}{2}}{c_{opt}} \right) \cdot \left( 1 - S\left( \frac{k - \frac{1+5}{2}}{c_{opt}} \right) \right), t = \sum_{k=1}^{5} y_k$$

Figure 5:
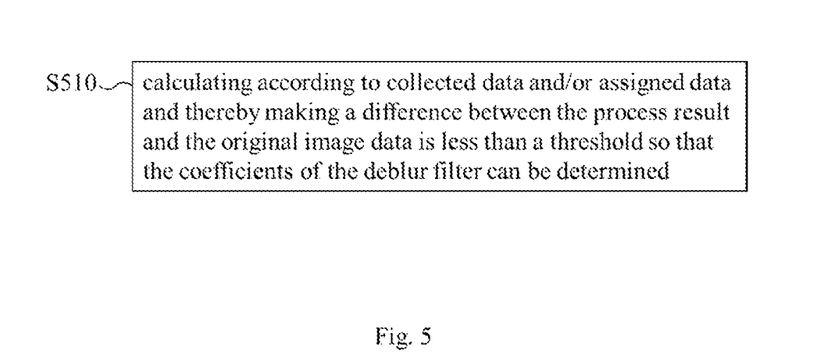
FIG. 5 shows an exemplary implementation of the step S130 of FIG. 1.

FIG. 5 shows an exemplary implementation of the step S130 of FIG. 1. This implementation includes:

S510: calculating according to collected data and/or assigned data and thereby making a difference between the process result and the original image data is less than a threshold so that the coefficients of the deblur filter can be determined.

For example, the step S510 includes: providing the sum of the coefficients of the deblur filter is one, finding out the coefficients of the deblur filter that are capable of minimizing the difference between the process result and the original image data.

An exemplary implementation of the embodiment of FIG. 1 is described in the following paragraphs.

The one-dimensional form of the blur kernel can be expressed as follows:

$$[s_1 s_2 s_3 s_4 s_5]$$

The one-dimensional signal of an ideal graphic card (i.e., the original one-dimensional signal) can be expressed as follows:

$$\begin{bmatrix} x_1 \\ \vdots \\ x_6 \end{bmatrix}$$

The blurred one-dimensional signal obtained by an imaging system processing the original one-dimensional signal can be expressed as follows:

$$\begin{bmatrix} s_1 & s_2 & s_3 & s_4 & s_5 & 0 \\ 0 & s_1 & s_2 & s_3 & s_4 & s_5 \end{bmatrix} \begin{bmatrix} x_1 \\ \vdots \\ x_6 \end{bmatrix}$$

The calculation of the gradient of the blurred one-dimensional signal can be expressed as follows:

$$[-1 \quad 1] \left( \begin{bmatrix} s_1 & s_2 & s_3 & s_4 & s_5 & 0 \\ 0 & s_1 & s_2 & s_3 & s_4 & s_5 \end{bmatrix} \begin{bmatrix} x_1 \\ \vdots \\ x_6 \end{bmatrix} \right)$$

The above equation is equivalent to the following: calculating the gradient of the original one-dimensional signal and then blurring the gradient with the blur kernel, which can be expressed as follows:

$$[s_1 \quad s_2 \quad s_3 \quad s_4 \quad s_5] \left( \begin{bmatrix} -1 & 1 & 0 & 0 & 0 & 0 \\ 0 & -1 & 1 & 0 & 0 & 0 \\ 0 & 0 & -1 & 1 & 0 & 0 \\ 0 & 0 & 0 & -1 & 1 & 0 \\ 0 & 0 & 0 & 0 & -1 & 1 \end{bmatrix} \begin{bmatrix} x_1 \\ \vdots \\ x_6 \end{bmatrix} \right)$$

The basis of the above equation is shown below:

$$[-1 \quad 1] \begin{bmatrix} s_1 & s_2 & s_3 & s_4 & s_5 & 0 \\ 0 & s_1 & s_2 & s_3 & s_4 & s_5 \end{bmatrix} =$$

$$[s_1 \quad s_2 \quad s_3 \quad s_4 \quad s_5] \begin{bmatrix} -1 & 1 & 0 & 0 & 0 & 0 \\ 0 & -1 & 1 & 0 & 0 & 0 \\ 0 & 0 & -1 & 1 & 0 & 0 \\ 0 & 0 & 0 & -1 & 1 & 0 \\ 0 & 0 & 0 & 0 & -1 & 1 \end{bmatrix}$$

The above description can be understood by way of the following explanation. First, the blurred one-dimensional signal can be expressed as follows:

$$b * x$$

In regard to the above equation, "b" denotes the blur kernel and "x" denotes the original one-dimensional signal.

The calculation of the gradient of the blurred one-dimensional signal can be expressed as follows:

$$g*(b*x)$$

In regard to the above equation, "g" denotes the calculation of the gradient. According to the commutative law found in the public website (https://en.wikipedia.org/wiki/Convolution#Algebraic_properties) and the associativity law found in the public website (https://en.wikipedia.org/wiki/Convolution#Differentiation), the above equation can be expressed as follows:

$$g*(b*x) = g*(x*b)$$

$$g*(x*b) = (g*x)*b$$

If the gradient of the original one-dimensional signal is an ideal step edge, the original one-dimensional signal will be an impulse signal as shown below:

$$g*x = [\ldots\ 0\ 0\ 1\ 0\ 0\ \ldots]$$

The convolution of the impulse signal and the blur kernel is still the blur kernel as shown below:

$$(g*x)*b = [\ldots\ 0\ 0\ 1\ 0\ 0\ \ldots]*b = b$$

The blur kernel is normalized, and this makes the sum of the coefficients of the blur kernel be one. The normalization holds true on the premise that the blur kernel does not change the overall brightness of an image.

To sum up, by calculating the gradient of a blurred image, the blur characteristics of an imaging system (i.e., the blur kernel) can be obtained.

The explanation of how to determine the coefficients of a deblur filter according to a blur kernel is described in the following paragraphs.

First, the aforementioned one-dimensional blur kernel $[s_1\ s_2\ s_3\ s_4\ s_5] = s^T$ can be expanded to be a 5×5 two-dimensional matrix u (i.e., a two-dimensional blur kernel) as shown below:

$$u = ss^T$$

In regard to the above equation, the $(i, j)^{th}$ term of the two-dimensional matrix u can be expressed as follows:

$$u_{i,j} = s_i s_j$$

In regard to the above equation, "i" and "j" are limited to [1, 5] respectively, "$s_i$" denotes the $i^{th}$ term of the one-dimensional blur kernel s, and "$s_j$" denotes the $j^{th}$ term of the one-dimensional blur kernel s. The two-dimensional matrix u can be expressed as follows:

$$u = \begin{bmatrix} u_{0,0} & u_{0,1} & u_{0,2} & u_{0,3} & u_{0,4} \\ u_{1,0} & u_{1,1} & u_{1,2} & u_{1,3} & u_{1,4} \\ u_{2,0} & u_{2,1} & u_{2,2} & u_{2,3} & u_{2,4} \\ u_{3,0} & u_{3,1} & u_{3,2} & u_{3,3} & u_{3,4} \\ u_{4,0} & u_{4,1} & u_{4,2} & u_{4,3} & u_{4,4} \end{bmatrix}$$

For example, an example of the two-dimensional matrix u is illustrated with the following table:

TABLE 1

| | | | | |
|---|---|---|---|---|
| 0.0133136 | 0.035503 | 0.0177515 | 0.035503 | 0.0133136 |
| 0.035503 | 0.0946746 | 0.0473373 | 0.0946746 | 0.035503 |
| 0.0177515 | 0.0473373 | 0.0236686 | 0.0473373 | 0.0177515 |
| 0.035503 | 0.0946746 | 0.0473373 | 0.0946746 | 0.035503 |
| 0.0133136 | 0.035503 | 0.0177515 | 0.035503 | 0.0133136 |

In Table 1, the sum of all the coefficients $u_{i,j}$ is one.

Next, the relation between the blurred pixels and the original pixels can be expressed as follows:

$$\begin{bmatrix} y_{1,1} \\ \vdots \\ y_{5,5} \end{bmatrix}_{25\times 1} = H \begin{bmatrix} x_{1,1} \\ \vdots \\ x_{9,9} \end{bmatrix}_{81\times 1} + N_{25\times 1}$$

$$y_{i,j} = \sum_{p=0}^{4} \sum_{q=0}^{4} u_{p,q} \cdot x_{i+p,j+q} + n_{i,j}$$

In regard to the above equation, "x" denotes an 81-dimensional vector obtained by expanding a 9×9 original image patch, and the pixel values of the original image patch is arranged in the row major order to be a column vector; "y" denotes a 25-dimensional vector obtained by expanding a 5×5 blurred pixels located in the center of the 9×9 image range; "H" denotes a 25×81 matrix; and "N" denotes a vector of 25-dimensional zero-mean noise and can be expressed in the row major order as follows: $[n_{1,1} \bullet\bullet\bullet n_{5,5}]^T$. In the matrix H, each row only has 25 elements being the coefficients $u_{i,j}$ while the other elements are zero. The matrix H can be expressed as follows:

$$H = \begin{bmatrix} u_{0,0} & u_{0,1} & u_{0,2} & u_{0,3} & u_{0,4} & 0 & 0 & 0 & 0 & u_{1,0} & u_{1,1} & u_{1,2} & u_{1,3} & u_{1,4} & 0 & 0 & \ldots \\ 0 & u_{0,0} & u_{0,1} & u_{0,2} & u_{0,3} & u_{0,4} & 0 & 0 & 0 & 0 & u_{1,0} & u_{1,1} & u_{1,2} & u_{1,3} & u_{1,4} & 0 & \ldots \\ 0 & 0 & u_{0,0} & u_{0,1} & u_{0,2} & u_{0,3} & u_{0,4} & 0 & 0 & 0 & 0 & u_{1,0} & u_{1,1} & u_{1,2} & u_{1,3} & u_{1,4} & \ldots \\ 0 & 0 & 0 & u_{0,0} & u_{0,1} & u_{0,2} & u_{0,3} & u_{0,4} & 0 & 0 & 0 & 0 & u_{1,0} & u_{1,1} & u_{1,2} & u_{1,3} & \ldots \\ 0 & 0 & 0 & 0 & u_{0,0} & u_{0,1} & u_{0,2} & u_{0,3} & u_{0,4} & 0 & 0 & 0 & 0 & u_{1,0} & u_{1,1} & u_{1,2} & \ldots \\ 0 & 0 & 0 & 0 & 0 & 0 & 0 & 0 & 0 & u_{0,0} & u_{0,1} & u_{0,2} & u_{0,3} & u_{0,4} & 0 & 0 & \ldots \\ 0 & 0 & 0 & 0 & 0 & 0 & 0 & 0 & 0 & 0 & u_{0,0} & u_{0,1} & u_{0,2} & u_{0,3} & u_{0,4} & 0 & \ldots \\ \vdots & \vdots & \vdots & \vdots & \vdots & \vdots & \vdots & \vdots & \vdots & \vdots & \ddots & \ddots & \ddots & \ddots & \ddots & \ddots \end{bmatrix}$$

In regard to the above equation, "Hx" means: performing convolution to the 9×9 original image (x) with a 5×5 blur kernel (i.e., the aforementioned two-dimensional matrix u) to obtain a 5×5 filtration result (y).

According to the '610 patent, a deblur filter g (i.e., the deblur kernel) can be found to satisfy the following equation:

$$y^T g \approx x^T f$$

In regard to the above equation, the deblur filter g is a 25-dimensional vector; and f is an identical filter (i.e., $x^T f = x^T$).

In a first circumstance (e.g., a circumstance that the pre-collected data are sufficient), the data collection Q having n pieces of data is obtained in advance. The data collection Q can be expressed as follows:

$$Q=\{(x_i,y_i)|0\leq i\leq n-1\}$$

In regard to the above equation, "$x_i$" and "$y_i$" are corresponding to the $i^{th}$ piece of the original image data and the $i^{th}$ piece of the blurred image data with noise interference respectively.

According to the '610 patent, the aforementioned equation "$y^T g \approx x^T f$" can be expressed as follows:

$$\text{Minimize } \frac{1}{n}\left\|\begin{bmatrix} y_0^T \\ \vdots \\ y_{n-1}^T \end{bmatrix} g - \begin{bmatrix} x_0^T \\ \vdots \\ x_{n-1}^T \end{bmatrix} f\right\|^2 \text{ subject to } Cg = d$$

Providing the sum of the coefficients of the deblur filter g is one, in regard to the above equation "C" denotes a 25-dimensional row vector where every element is one, and "d" is one. "C" and "d" can be expressed as follows:

$$C=[1 \cdots 1]$$

$$d=1$$

According to the '610 patent, "A" and "b" can be defined as follows:

$$A = \frac{1}{\sqrt{n}}\begin{bmatrix} y_0^T \\ \vdots \\ y_{n-1}^T \end{bmatrix}, b = \frac{1}{\sqrt{n}}\begin{bmatrix} x_0^T \\ \vdots \\ x_{n-1}^T \end{bmatrix} f$$

The coefficients of the deblur filter g is the solution to the following equation:

$$\begin{bmatrix} A^T A & C^T \\ C & 0 \end{bmatrix}\begin{bmatrix} g \\ z \end{bmatrix} = \begin{bmatrix} A^T b \\ d \end{bmatrix}$$

In regard to the above equation, the definition of "z" is described in pages 15-16 of the public document "Constrained least squares" that can be found in the public website (http://www.seas.ucla.edu/~vandenbe/133A/lectures/cls.pdf), and is also described in pages 3-4 of the public document "Derivative, Gradient, and Lagrange Multipliers" that can be found in the public website (http://ee263.stanford.edu/notes/gradient-lagrange.pdf).

According to the '610 patent, since the aforementioned "N" is the zero-mean noise, the following equations are established:

$$\lim_{n\to\infty} A^T A = E[yy^T] = H \cdot E[xx^T] \cdot H^T + E[nn^T]$$

-continued
$$\lim_{n\to\infty} A^T b = E[yx^T] \cdot f = H \cdot E[xx^T] \cdot f$$

In the above equation, $E[xx^T]$ is a symmetric positive semidefinite matrix, and "n" is $[n_{1,1} \cdots n_{5,5}]$ as mentioned in the preceding paragraph. When the zero-mean noise "N" is white noise, the following equation is established:

$$E[nn^T]=\sigma_n^2 I$$

In regard to the above equation, "$\sigma$" is the standard deviation of noise and "I" is an identity matrix. According to the '610 patent, the Eigen Decomposition can be used to process $E[xx^T]$ as shown below:

$$E[xx^T] = \lim_{k\to\infty} \frac{1}{k}\sum_{i=1}^{k} x_i x_i^T = [e_0 \cdots e_{m-1}]\begin{bmatrix} \lambda_0 & 0 & \cdots & 0 \\ 0 & \lambda_1 & \ddots & \vdots \\ \vdots & \ddots & \ddots & 0 \\ 0 & \cdots & 0 & \lambda_{m-1} \end{bmatrix}\begin{bmatrix} e_0^T \\ \vdots \\ e_{m-1}^T \end{bmatrix}$$

In regard to the above equation, $e_o, \cdots, e_{m-1}$ is a m-dimensional eigen vector and is an orthonormal basis set, and its corresponding eigen values are $\lambda_0 \geq \cdots \geq \lambda_{m-1} \cong 0$. In regard to the aforementioned equations, the matrix $E[xx^T]$ is originated from the known data collection Q, the matrix H is derived from the blur kernel, and accordingly the coefficients of the deblur filter can be derived therefrom.

In a second circumstance (e.g., a circumstance that pre-collected data are not sufficient), a diagonal matrix can be customed to approximate $E[xx^T]$ according to the '610 patent, which is shown below:

$$E[xx^T] \approx$$

$$[d_{0,0} \; d_{0,1} \; \cdots \; d_{\sqrt{m}-1,\sqrt{m}-1}]\begin{bmatrix} w_{0,0} & 0 & \cdots & 0 \\ 0 & w_{0,1} & \ddots & \vdots \\ \vdots & \ddots & \ddots & 0 \\ 0 & \cdots & 0 & w_{i,j} \end{bmatrix}\begin{bmatrix} d_{0,0}^T \\ d_{0,1}^T \\ \vdots \\ d_{\sqrt{m}-1,\sqrt{m}-1}^T \end{bmatrix}$$

In regard to the above equation, "$d_{0,0}, \cdots, d_{i,j}$" is a m-dimensional discrete cosine transform (DCT) orthonormal basis; since x is an 81-dimensional vector, the m is 81. Furthermore, when the square of the sum of the suffixes (i.e., $(i+j)^2$) of $w_{i,j}(0\leq i,j\leq\sqrt{m}-1)$ becomes greater, the frequency with respect to $w_{i,j}$ is higher. $d_k^T$ can be expressed as follows:

$$d_k^T \stackrel{def}{=} \begin{cases} \sqrt{\frac{1}{\sqrt{m}}}\left[\cos\left(\frac{\pi}{\sqrt{m}}\cdot\left(0+\frac{1}{2}\right)\cdot k\right) \cdots \cos\left(\frac{\pi}{\sqrt{m}}\cdot\left(\sqrt{m}-1+\frac{1}{2}\right)\cdot k\right)\right] & \text{if } k=0 \\ \sqrt{\frac{2}{\sqrt{m}}}\left[\cos\left(\frac{\pi}{\sqrt{m}}\cdot\left(0+\frac{1}{2}\right)\cdot k\right) \cdots \cos\left(\frac{\pi}{\sqrt{m}}\cdot\left(\sqrt{m}-1+\frac{1}{2}\right)\cdot k\right)\right] & \text{if } 0<k<\sqrt{m} \end{cases}$$

It is noted that $d_{i,j}$ can be expressed as follows: $d_{i,j}=d_i\times d_j^T$ ($0\leq i,j\leq\sqrt{m}-1$), wherein it is a column vector arranged in the row major order.

In regard to the diagonal matrix, since the DCT strength of a natural image is inversely proportional to frequency, $w_{i,j}$ will become smaller if the square of the sum of the suffixes (i.e., $(i+j)^2$) of $w_{i,j}$ becomes greater. For example, $w_{i,j}$ is equal to $$e^{\left(-\frac{(i+j)^2}{2\sigma^2}\right)},$$

wherein "i" is between 0~$\sqrt{m-1}$ and "j" is also between 0~$\sqrt{m-1}$, "m" denotes the dimension of the aforementioned data collection Q, and "σ" here denotes the standard deviation of data distribution. Since the diagonal matrix is customed, the coefficients of the deblur filter g can be derived accordingly.

It should be noted that people having ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the method of the present disclosure can determine the coefficients of a deblur kernel without expensive measuring equipment.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method for determining deblur filter coefficients, comprising the following steps:

generating an edge profile according to data of an image;

estimating a blur kernel according to the edge profile, wherein the blur kernel indicates how an imaging process blurs original image data and thereby generates blurred image data; and determining coefficients of a deblur filter to make a process result of the deblur filter processing the blurred image data approach the original image data, wherein the step of generating the edge profile includes:

ascertaining an edge position of each of multiple rows in a region of interest (ROI) of the image to obtain edge positions of the multiple rows, wherein each of the multiple rows includes multiple edge-neighboring pixels, and the distance between each of the multiple edge-neighboring pixels of a certain row of the multiple rows and the edge position of the certain row is shorter than a predetermined distance;

aligning the edge positions of the multiple rows; and after aligning the edge positions of the multiple rows, averaging all of the edge-neighboring pixels of the multiple rows at a same horizontal position and thereby obtaining a row of average values as the edge profile.

2. The method of claim 1, wherein the step of aligning the edge positions of the multiple rows includes:

ascertaining a pixel position of a maximum absolute value of gradient in each of the multiple rows and then treating the pixel position as an edge position, and thereby obtaining pixel positions of the multiple rows as the edge positions of the multiple rows; and aligning the edge positions of the multiple rows and thereby making the edge positions of the multiple rows have a same horizontal position.

3. The method of claim 1, wherein the step of estimating the blur kernel includes:

performing first-order differentiation to the edge profile in a forward direction and thereby obtaining a row of forward-direction differential values;

performing first-order differentiation to the edge profile in a backward direction and thereby obtaining a row of backward-direction differential values; and summing up the row of forward-direction differential values and the row of backward-direction differential values to obtain a row of summation values, and then performing normalization to the row of summation values to obtain a one-dimensional form of the blur kernel.

4. The method of claim 1, wherein the step of estimating the blur kernel includes:

using a sigmoid edge model to approximate data of the edge profile, wherein a sigmoid function is applied in the sigmoid edge model, and the sigmoid edge model includes a to-be-determined parameter;

defining an error function to express an error of the to-be-determined parameter;

finding out an optimum value by a Gradient Descent algorithm, wherein when the to-be-determined parameter is the optimum value, the error is minimum; and using the optimum value and a first derivative function of the sigmoid function to obtain the blur kernel.

5. The method of claim 1, wherein a sum of the coefficients of the blur kernel is one.

6. The method of claim 1, wherein a sum of the coefficients of the deblur filter is one.

7. The method of claim 1, wherein the step of determining the coefficients of the deblur filter includes: calculating according to collected data and/or assigned data and thereby making a difference between the process result and the original image data is less than a threshold.

8. The method of claim 7, wherein the step of determining the coefficients of the deblur filter includes: providing a sum of the coefficients of the deblur filter is one, finding out the coefficients of the deblur filter capable of minimizing the difference between the process result and the original image data.

* * * * *